United States Patent [19]

Leyerle et al.

[11] Patent Number: 4,471,072
[45] Date of Patent: Sep. 11, 1984

[54] PREPARATION OF CARBONACEOUS PYROPOLYMERS

[75] Inventors: Richard W. Leyerle, Arlington Heights; Lawrence B. Welsh, Evanston; Mary A. Vanek, Mount Prospect, all of Ill.

[73] Assignee: UOP Inc., Des Plaines, Ill.

[21] Appl. No.: 451,524

[22] Filed: Dec. 20, 1982

[51] Int. Cl.³ ............................................. B01J 21/18
[52] U.S. Cl. ..................... 502/413; 502/415; 502/416; 502/402; 502/423; 502/425; 502/426; 502/427; 502/432; 502/417; 502/418
[58] Field of Search .............. 502/402, 413, 415, 416, 502/423, 417, 418, 430, 432, 437, 182, 180, 436, 420, 425, 426, 427

[56] References Cited

U.S. PATENT DOCUMENTS

| | | | |
|---|---|---|---|
| 3,342,555 | 9/1967 | McMillan | 502/436 X |
| 3,651,386 | 3/1972 | Youtsey et al. | 317/237 |
| 3,997,689 | 12/1976 | Hervert | 427/82 |
| 4,025,689 | 5/1977 | Kobayashi et al. | 502/432 X |
| 4,082,661 | 4/1978 | Aoki et al. | 502/432 X |
| 4,197,272 | 4/1980 | Tighe | 502/180 X |
| 4,263,268 | 4/1981 | Knox et al. | 502/413 X |
| 4,329,260 | 5/1982 | Lester et al. | 502/423 X |

*Primary Examiner*—Patrick Garvin
*Attorney, Agent, or Firm*—James R. Hoatson, Jr.; Raymond H. Nelson; William H. Page, II

[57] ABSTRACT

Carbonaceous pyropolymers possessing recurring units containing at least carbon and hydrogen atoms composited on a solid support may be prepared in a solid state process. The process is effected by treating a high surface area solid support such as an inorganic oxide as exemplified by alumina with an organic monomer which is capable of being polymerized by thermal, ionic, or free radical polymerization methods. The monomer is polymerized on the surface of the support under polymerization conditions and thereafter the polymer-coated support is subjected to pyrolysis at temperatures ranging from about 600° to about 1200° C. to form a carbonaceous pyropolymer. If so desired, this composite may then be subjected to the action of a dissolving agent under conditions which will dissolve or leach out the solid support, thus leaving a carbonaceous pyropolymer possessing recurring units containing at least carbon and hydrogen atoms.

12 Claims, No Drawings

PREPARATION OF CARBONACEOUS PYROPOLYMERS

BACKGROUND OF THE INVENTION

Heretofore, carbonaceous pyropolymers which are composited on a solid support have been prepared by subjecting a solid support to contact with a pyropolymer precursor at an elevated temperature, said pyropolymer precursor being in a gaseous state. For example, U.S. Pat. No. 3,651,386 discloses a method for preparing such a composition in which a porous refractory oxide material is positioned as a bed in a vessel which is provided with heating means, and the pyrolyzable substance in a carrier gas is passed downward through the refractory oxide bed at an elevated temperature whereby a carbonaceous pyropolymer possessing recurring units containing at least carbon and hydrogen atoms is composited on the solid refractory oxide. Another method of preparing such a composition is found in U.S. Pat. No. 3,997,689 in which refractory oxide materials are introduced into the reaction section which may comprise a boring screw reactor. In this reactor, the inorganic refractory oxide material is contacted with a gassified hydrocarbon while maintaining the support material in a semi-fluidized state.

The methods of preparing the desired composition according to these prior patents necessitates the use of relatively expensive equipment which is needed for a gas phase pyrolysis. As will hereinafter be shown in greater detail, it has now been discovered that a carbonaceous pyropolymer possessing recurring units containing at least carbon and hydrogen atoms composited on a solid support may be prepared in a solid state process utilizing relatively inexpensive equipment such as simple furnaces. By utilizing such equipment, it is possible to reduce the overall cost of the finished product and thus render the product more readily available for various uses of the type hereinafter set forth in greater detail.

SUMMARY OF THE INVENTION

This application relates to a process for preparing compositions of matter comprising a carbonaceous pyropolymer possessing recurring units containing at least carbon and hydrogen atoms composited on a solid support. More specifically, the invention is concerned with a process for preparing a carbonaceous pyropolymer possessing recurring units containing at least carbon and hydrogen atoms composited on a solid support utilizing a solid state preparation. The compositions of matter which are prepared according to the process of this invention will find a wide variety of uses in the chemical field. For example, the compositions which will possess semi-conducting properties may be used for electrical applications such as heterojunction transistors, field-effect transistors, thermo elements in thermoelectric generators, refrigerators, temperature-sensing devices, as electrodes in electrochemical cells, memory devices, inductive elements and in separations applications.

The particular composition of matter comprising a carbonaceous pyropolymer possessing recurring units containing at least carbon and hydrogen atoms composited on a solid support which is prepared according to the process of this invention will have particular use in applications for the separation of liquids. The material which is produced according to the present process will possess a pore size and pore volume which is different from that which is possessed by the solid support upon which the carbonaceous pyropolymer is composited. As will hereinafter be shown in greater detail, material resulting from the process of this invention will possess pore sizes which are lower or less in diameter than those of the original substrate and will have an increased pore volume in the small pore sizes. For example, the number of pores in the range of from 0 to 1.6 nanometers (nm) will be increased and will comprise a substantial part or portion of the total pores in the material. This large number of small pores will be of interest inasmuch as material may then be used in separation applications in place of other supports such as activated carbon. This is particularly advantageous inasmuch as activated carbons are usually prepared by a relatively complicated process involving a plurality of steps or operations, thereby contributing to a higher cost of operation.

It is therefore an object of this invention to provide a process for preparing carbonaceous pyropolymers possessing recurring units containing at least carbon and hydrogen atoms composited on a solid support.

A further object of this invention is to provide a solid state process for preparing compositions of matter which are useful in a wide variety of applications.

In one aspect, an embodiment of this invention is found in a solid state process for the preparation of a carbonaceous pyropolymer possessing recurring units containing at least carbon and hydrogen atoms composited on a solid support, which comprises admixing an organic monomer capable of being polymerized with a high surface area solid support, polymerizing said monomer at polymerization conditions, pyrolyzing the resultant polymer-coated solid support at pyrolysis conditions, and recovering the resultant high surface area carbonaceous pyropolymer possessing recurring units containing at least carbon and hydrogen atoms composited on a solid support.

A specific embodiment of this invention is found in a solid state process for the preparation of a carbonaceous pyropolymer possessing recurring units containing carbon and hydrogen atoms composited on a solid support which comprises admixing divinylbenzene with gamma-alumina in the presence of azo-bis-isobutyronitrile, polymerizing said monomer at temperatures from about ambient to about 250° C. and a pressure in the range of from about atmospheric to about 100 atmospheres, pyrolyzing the resultant polymer-coated alumina at a temperature in the range of from about 600° to about 1200° C. and a pressure in the range of from about atmospheric to about 100 atmospheres, and recovering the resultant carbonaceous pyropolymer possessing recurring units containing at least carbon and hydrogen atoms composited on gamma-alumina.

Other objects and embodiments will be found in the following further detailed description of the present invention.

DETAILED DESCRIPTION OF THE INVENTION

As hereinbefore set forth, the present invention is concerned with a process for preparing a carbonaceous pyropolymer possessing recurring units consisting of at least carbon and hydrogen atoms composited on a solid support utilizing a solid state method for the preparation thereof. As was previously discussed, this type of composition has been prepared by vaporizing a hydrocarbon and thereafter pyrolyzing the vaporous hydrocarbon onto the surface of the solid support or substrate. In contradistinction to this, the present process employs a different technique in which the pyropolymer precursor comprises a monomer which is capable of being polymerized by thermal, ionic, or free radical polymerization methods. In general, the solid support or substrate is contacted with a monomer solution following which the monomer is polymerized on the surface of the support. Following the polymerization, the resulting composite is then pyrolyzed to decompose the polymer and form the desired carbonaceous pyropolymer. The solid support which is utilized in the process of this invention preferably comprises an inorganic refractory oxide which may be in any form. For example, the refractory oxide may be in the form of loose or compacted dry powders, cast or calcined sols, heated sols, flats, cylinders, spheres, pellets, rods, etc. Again, in the preferred embodiment of the invention the inorganic refractory oxide will possess a relatively high surface area in the range of from about 1 to about 500 $m^2/g$. Some specific examples of these inorganic refractory oxides will include alumina, particularly gamma-alumina, theta-alumina, silica, or mixtures of inorganic refractory oxides such as silica-alumina. It is to be understood that these examples of supports or substrates which may be employed are only representative of the class of compounds which may be used and that the present invention is not necessarily limited thereto.

Examples of organic monomers which may be employed to produce the polymeric coating of the solid support prior to pyrolysis of the composite will include such compounds as styrene, divinylbenzene, phenol-formaldehyde resins, acrylonitrile-styrene resins, allyl resin monomers, epoxy resins, melamine-formaldehyde resins, polyester resins, polyimide resins, polyurethane resins, polycarbonate resins, etc. Again, as in the case of the solid supports, the list of polymerizable monomers is only representative of the type of compounds which may be employed as pyropolymer precursors and that the present invention is not necessarily limited thereto.

The process may be effected by contacting the solid support of the type hereinbefore set forth in greater detail with a solution of the organic monomer. In addition, if so desired, the admixture of the solid support and inorganic monomer may also contain a polymerization initiator as an aid to polymerization, an example of such an initiator being azo-bis-isobutyronitrile. The polymerization of the organic monomer is effected at polymerization conditions which will include a temperature in the range of from about ambient to about 250° C. and a pressure in the range of from about atmospheric to about 100 atmospheres. The polymerization of the monomer is allowed to proceed for a period of time which may range from about 1 to about 100 hours or more, the particular polymerization time being dependent upon the organic monomer undergoing polymerization as well as the operating parameters of temperature and pressure. Following the completion of the polymerization process, the polymer-coated substrate is recovered and subjected to pyrolysis, whereby the polymer is converted to a carbonaceous pyropolymer possessing recurring units containing at least carbon and hydrogen atoms. Pyrolysis conditions which are employed to produce the desired composition will include temperatures in the range of from about 600° to about 1200° C. as well as pressures ranging from about atmospheric to about 100 atmospheres. In the preferred embodiment of the invention, the pyrolysis is effected in the presence of an inert or reducing gas such as nitrogen, helium, argon or hydrogen, the pyrolysis being effected for a period of time sufficient to convert the polymer to the carbonaceous pyropolymer and usually in a range of from about 0.5 to about 4 hours or more.

If so desired, the resulting composition comprising a carbonaceous pyropolymer possessing recurring units consisting of at least carbon and hydrogen atoms composited on a solid support may be further treated in such a manner so that the solid support is dissolved and removed, thereby leaving only the carbonaceous pyropolymer possessing recurring units containing at least carbon and hydrogen atoms. The removal of the solid support is effected by leaching, utilizing either an acid or a base as the dissolving agent. The dissolution or leaching of the base material may be effected over a wide range of temperatures, said range being from about ambient (20°–25° C.) up to about 250° C. or more for a period of time which may range from about 2 to about 72 hours or more in duration. It is to be understood that the operating parameters of the leaching or dissolving step will vary over a wide range and will be dependent upon a combination of time, temperature, strength of the leaching solution, etc. Examples of acids or bases which may be utilized to dissolve out the base material, that is, the refractory inorganic oxide will include inorganic acids such as phosphoric acid, sulfuric acid, nitric acid, hydrochloric acid; organic acids such as methylsulfonic acid, ethylsulfonic acid, propylsulfonic acid, toluenesulfonic acid, etc. or strong bases such as sodium hydroxide, potassium hydroxide, lithium hydroxide, rubidium hydroxide, cesium hydroxide, etc. It is to be understood that the aforementioned dissolving agents are only representative of the class of compounds which may be used and that any chemical which may be capable of removing the refractory inorganic oxide while (1) retaining the high surface area of the carbonaceous pyropolymer and (2) retaining the particle size or particular shape of the original substrate may be employed.

The process of the present invention may be effected in any suitable manner and may comprise a batch or continuous type of operation. For example, when a batch type operation is employed, a quantity of the high surface area solid support such as gamma-alumina in the shape of spheres, rods, pellets, etc. may be placed in an appropriate apparatus. A solution of an organic monomer is also placed in the vessel along with, if so desired, a polymerization initiator following which the impregnation of the support with the monomer is effected in a vacuum. After impregnating the monomer on the surface of the substrate for a period of time sufficient to control the amount of monomer on the surface of the substrate, the excess solution of the material is then removed by filtration. The material is then allowed to polymerize on the surface of the support utilizing predetermined polymerization conditions, i.e. temperature, pressure, reaction period, etc. Following the polymerization of the monomer on the support, the polymer-coated support or substrte is placed in an appropriate apparatus such as a quartz tube whereby the carbonaceous pyropolymer is formed by means of pyrolysis. The pyrolysis is effected by heating the vessel in an appropriate apparatus such as a furnace under the flow of an inert gas of the type hereinbefore set forth. Upon completion of the pyrolysis period, the desired composition comprising a carbonaceous pyropolymer possessing recurring units containing at least carbon and hydrogen atoms composited on a solid support may be recovered.

In the event that the removal of the substrate is desired, the carbonaceous pyropolymer possessing recurring units containing at least carbon and hydrogen atoms composited on a solid support may then be placed in a leaching bath whereby it is contacted with a dissolving agent of the type hereinbefore set forth under conditions selected to dissolve the support. The dissolution of the solid support is effected under conditions which will preferably include an elevated temperature for a period of time sufficient to dissolve substantially all of the solid support.

It is also contemplated within the scope of this invention that the composition of matter may be prepared in a solid state manner utilizing a continuous method of operation. When such a type of operation is employed, the components of the finished composition comprising a solid support or substrate and the organic monomer are continuously charged to a reaction vessel which is maintained at the proper operating conditions of temperature and pressure. After passage through the vessel for a period of time sufficient to effect the polymerization of the monomer and produce a polymer-coated support, the reaction mixture is continuously withdrawn from the vessel and the excess solution is separated from the polymer-coated support. The latter is then continuously charged to a pyrolysis zone wherein pyrolysis of the polymer to form the desired carbonaceous pyropolymer is effected in the presence of an inert gas at pyrolysis conditions similar to those hereinbefore set forth. After passage through the pyrolysis zone for a time sufficient to effect the desired pyrolysis, the composition is continuously withdrawn therefrom and recovered. Alternatively, if further treatment of the carbonaceous pyropolymer possessing recurring units containing at least carbon and hydrogen atoms composited on a solid support is desired, the composition is continuously charged to a leaching or dissolution vessel wherein it is contacted with a dissolving agent capable of dissolving the substrate. Again, after passage through this vessel for a period of time sufficient to effect the dissolution of the substrate, the product comprising the carbonaceous pyropolymer possessing recurring units containing at least carbon and hydrogen atoms is continuously withdrawn, separated from the leaching or dissolving agent, and recovered.

The desired compositions of matter comprising either a carbonaceous pyropolymer possessing recurring units containing at least carbon and hydrogen atoms composited on a solid support or a carbonaceous pyropolymer possessing recurring units containing at least carbon and hydrogen atoms which has been obtained by dissolving out the substrate will possess physical properties which will make them desirable for a wide variety of uses. As was hereinbefore set forth, the carbonaceous pyropolymers will possess pore sizes which are smaller in diameter than the pore sizes of the original substrate as well as possessing an increased pore volume in the small pore sizes. In addition to their use as a semiconducting material, the carbonaceous pyropolymers may also be utilized in separations applications. This use is due to the fact that the carbonaceous pyropolymers will possess a substantial portion of the surface area of the material in micropores of less than about 1.6 nanometers in diameter. This characteristic will impart a molecular sieve character to the materials and thus permit the use thereof as components in the separation of various liquids.

The following examples are given for purposes of illustrating the process of this invention as well as the characteristics of the products obtained from the process. However, it is to be understood that these examples are given merely for purposes of illustration and that the present process is not necessarily limited thereto.

EXAMPLE I

In this example, 20.31 grams of ⅛" gamma-alumina spheres were placed in a Teflon bottle along with a solution containing 38 ml of p-diethylbenzene, 8.85 grams of divinylbenzene and 0.0495 grams of a polymerization initiator comprising azo-bis-isobutyronitrile. The bottle was sealed, placed in a mineral oil bath and heated at a temperature of 50° C. for a period of 72 hours to polymerize the divinylbenzene on the alumina substrate. At the end of the polymerization period, heating was discontinued and the excess solution was separated from the polymer-coated alumina by means of filtration. The recovered composite was then placed in a quartz glass tube and the tube was placed into a vertical furnace. The tube was gradually heated to a temperature of 800° C. at a rate of 50° C. per 15 minutes, the pyrolysis being effected in the presence of a stream of nitrogen which was charged to the tube at a rate of 250 ml per minute. Upon reaching 800° C., the composite was pyrolyzed for a period of 1 hour at this temperature and thereafter was allowed to return to room temperature. The composite comprising a carbonaceous pyropolymer possessing recurring units containing at least carbon and hydrogen atoms composited on alumina was recovered an analyzed. The results of this analysis are set forth in Table I below:

TABLE I

| Overall Weight Increase (%) | 17.8 |
|---|---|
| C (wt-%) | 17.21 |
| H (wt-%) | 0.67 |
| BET Surface Area (m$^2$/g) | 98 |
| Pore Volume (mL/g) | 0.27 |
| Average Pore Diameter (nm) | 11.0 |

EXAMPLE II

In this example, 19.19 grams of ⅛" gamma-alumina spheres along with a solution of 46.76 grams of divinylbenzene and 0.0459 grams of a polymerization initiator comprising azo-bis-isobutyronitrile were placed in a Teflon bottle which was thereafter sealed. The bottle was placed in a mineral oil bath and heated to a temperature in the range of from about 60° to about 65° C. for a period of 48 hours. At the end of the 48 hour period, heating was discontinued, the excess hydrocarbon mixture was separated from the composite and the polymer-coated spheres were dried slightly on a hot plate in a flowing nitrogen atmosphere. The sample was weighed and 26.44 grams of polymeric material was found on the spheres. Following this, the composite was loaded into a quartz tube which was placed in a verticle tube furnace. As in Example I, the material was slowly heated to a temperature of 800° C. at a rate of 50° C. per 15 minutes, the heating being effected in a nitrogen flow of about 250 ml per minute. Upon reaching 800° C., the sample was pyrolyzed at this temperature for a period of 1 hour following which heating was discontinued and the carbonaceous pyropolymer possessing recurring units containing at least carbon and hydrogen atoms composited on alumina was recovered. The carbonaceous pyropolymer deposition appeared to be uniform over the surface of the alumina and analysis of the composite produced the results set forth in Table II below:

TABLE II

| | |
|---|---|
| Overall Weight Increase (%) | 23.2 |
| C (wt-%) | 23.99 |
| H (wt-%) | 0.70 |
| BET Surface Area (m$^2$/g) | 272 |
| Pore Volume (mL/g) | 0.19 |
| Average Pore Diameter (nm) | 2.5 |

EXAMPLE III

As an illustration of the physical properties which are possessed by carbonaceous pyropolymers possessing recurring units containing at least carbon and hydrogen atoms, ⅛" gamma-alumina spheres were contacted with a solution of divinylbenzene and a polymerization initiator comprising azo-bis-isobutyronitrile. After allowing the polymerization of the divinylbenzene to proceed for a period of about two days by heating the mixture at 60° C., the polymer-coated alumina was recovered. Pyrolysis was effected by subjecting the material to a temperature of 800° C. for a period of 1 hour in a nitrogen atmosphere. The physical properties of the resultant carbonaceous pyropolymer possessing recurring units containing at least carbon and hydrogen atoms composited on alumina were measured and the material was then treated with an 85% phosphoric acid solution at a temperature of 160° C. for a period of about 20 hours to dissolve out the gamma-alumina support. At the end of this period, the carbonaceous pyropolymer possessing recurring units containing at least carbon and hydrogen atoms was recovered, washed, heated in the water for a period of two hours at 80° C., again washed with deionized water and dried. Again, the physical characteristics or properties of the carbonaceous pyropolymer possessing recurring units containing at least carbon and hydrogen atoms were measured. The results of these measurements are set forth in Table III below:

TABLE III

| | Original Gamma-Alumina | Pyrolysis Product | Leached Product |
|---|---|---|---|
| BET Surface Area (m$^2$/g) | 166 | 272 | 1320 |
| Pore Vol. (ml/g) (pores <30.0 nm diameter) | 0.44 | 0.17 | 1.68 |
| Average Pore Dia. (nm) (pores < 30.0 nm diameter) | 10.7 | 2.5 | 5.1 |
| Calculated Surface Area (m$^2$/g) (pores 1.6 to 30.0 nm diameter) | 145 | 55 | 465 |
| Peak Crush Strength (kg) | 11.6 | 7.6 | <0.5 |
| Average Crush Strength (kg) | 7.5 | 4.0 | <0.5 |

In addition, it was also found that the pyrolysis product contained 23.99 wt. % of carbon and 0.70 wt. % of hydrogen.

EXAMPLE IV

To illustrate the difference in properties between composites which have been prepared according to prior art methods and the method of the present invention, a carbonaceous pyropolymer possessing recurring units containing at least carbon and hydrogen atoms composited on a solid support was prepared by treating alumina with benzene at a temperature of 800° C. The resulting composite comprised a 1.0 to 2.0 nm dense film of pyropolymer deposited on 5.0 nm alumina crystallites. A second composite was prepared by impregnating alumina with divinylbenzene at a temperature of 60° C. to form a polymeric film on the alumina. This composite was then heated at a temperature of 800° C. to pyrolyze the polymer and form a composite comprising an ultra-micropore pyropolymer deposited in the alumina pore structure. A comparison of the properties of the two composites is set forth in Table IV below in which the conventional pyropolymer is designated "A" and the pyropolymer of the present invention is designated "B".

TABLE IV

| | AL$_2$O$_3$ | A | B |
|---|---|---|---|
| Carbon (wt. %) | — | 25.32 | 23.99 |
| Surface Area (m$^2$/g) (eqn.) | 166 (BET) | 113 (BET) | 272 (Langmuir) |
| Pore Volume (ml/g) (pores <30.0 nm diameter) | 0.44 | 0.24 | 0.17 |
| Pores 1.6–30.0 nm N$_2$ Adsorption | | | |
| Pore Volume (ml/g) | 0.43 | 0.23 | 0.10 |
| Surface Area (m$^2$/g) | 148 | 92 | 55 |
| Average Pore Diameter (nm) | 11.6 | 10.0 | 7.3 |
| Pores 0–1.6 nm N$_2$ Adsorption | | | |
| Pore Volume (ml/g) | 0.01 | 0.01 | 0.07 |
| Surface Area (m$^2$/g) | 18 | 21 | 217 |
| Average Pore Diameter (nm) | 2.2 | 1.9 | 1.3 |

EXAMPLE V

As a further illustration of the variants found between the conventional composite and the composite of the present invention, the two carbonaceous pyropolymers possessing recurring units containing at least carbon and hydrogen atoms composited on a high surface area support were subjected to a leaching step wherein the composite was contacted with H$_3$PO$_4$ at a temperature of 160° C. whereby the alumina substrate was dissolved and recovered. After drying, the two composites were analyzed and the results set forth in Table V below in which the carbonaceous pyropolymer possessing recurring units containing at least carbon and hydrogen atoms which had been prepared according to the conventional method was designated "A" and the carbonaceous pyropolymer possessing recurring units containing at least carbon and hydrogen atoms prepared according to the process of the present invention was designated "B".

TABLE V

| | Al₂O₃ | A | B |
|---|---|---|---|
| Surface Area (m²/g) (eqn.) | 166 (BET) | 1142 (BET) | 1740 (Langmuir) |
| Pore Volume (ml/g) Pores <30.0 nm diameter | 0.44 | 2.52 | 1.65 |
| Pores 1.6–30.0 nm N₂ Adsorption | | | |
| Pore Volume (ml/g) | 0.43 | 2.51 | 1.26 |
| Surface Area (m²/g) | 148 | 1142 | 586 |
| Average Pore Diameter | 11.6 | 8.3 | 8.6 |
| Pores 0–1.6 nm N₂ Adsorption | | | |
| Pore Volume (ml/g) | 0.01 | 0.01 | 0.39 |
| Surface Area (m²/g) | 18 | 0 | 1154 |
| Average Pore Diameter | 2.2 | Not Applicable | 1.3 |

It is therefore readily apparent from a comparison of the two materials in Table IV and V herein that the composites prepared according to the process of the present invention possess a distinctly different structure with regard to pore size and pore volumes, that is, pores of smaller diameter and increased pore volume of said smaller pores, than did those composites which had been prepared according to the conventional methods of operation.

EXAMPLE VI

In a similar manner, other inorganic oxides such as silica or silica-alumina may also be treated with other organic monomers such as styrene or a phenol-formaldehyde resin by free radical or ionic polymerization mechanisms to form polymers on the surface of the inorganic oxide. The polymer-coated inorganic oxides may then be subjected to a pyrolysis step in the solid state at a temperature which may range from about 600° to about 1200° C. for a period of time ranging from 1 to 4 hours to form a carbonaceous pyropolymer possessing recurring units containing at least carbon and hydrogen atoms composited on the inorganic oxide support. These carbonaceous pyropolymers may then, if so desired, be further subjected to the action of a dissolving agent whereby the inorganic oxide support may be dissolved and removed from the resulting carbonaceous pyropolymer possessing recurring units containing at least carbon and hydrogen atoms.

We claim as our invention:

1. A solid state process for preparation of a carbonaceous pyropolymer possessing recurring units containing at least carbon and hydrogen atoms on a solid support, wherein said pyropolymer possesses a larger number of smaller pores than possessed by said support, which comprises admixing an organic monomer selected from the group consisting of styrene and divinylbenzene which are capable of being polymerized with a high surface area solid support, polymerizing said selected monomer at a temperature in the range of from about ambient to about 250° C. and a pressure in the range of from about atmospheric to about 100 atmospheres, and then pyrolyzing the resultant polymer-coated solid support at a temperature in the range of from about 600° C. to about 1200° C. and a pressure in the range of from about atmospheric to about 100 atmospheres, and thereafter recovering the resultant high surface area carbonaceous pyropolymer possessing recurring units containing at least carbon and hydrogen atoms having a larger number of smaller pores than possessed by said solid support.

2. The process as set forth in claim 1 in which said solid support comprises a high surface area inorganic oxide.

3. The process as set forth in claim 2 in which said high surface area inorganic oxide is an alumina.

4. The process as set forth in claim 2 in which said high surface area inorganic oxide is silica.

5. The process as set forth in claim 1 in which said admixture of an organic monomer and a solid support contains a polymerization initiator.

6. The process as set forth in claim 5 in which said polymerization initiator is azo-bis-isobutyronitrile.

7. The process as set forth in claim 1 in which said carbonaceous pyropolymer possessing recurring units containing at least carbon and hydrogen atoms composited on a solid support is contacted with a dissolving agent for said support under conditions selected to dissolve said support.

8. The process as set forth in claim 7 in which said dissolving agent is an inorganic acid.

9. The process as set forth in claim 8 in which said inorganic acid is phosphoric acid.

10. The process as set forth in claim 8 in which said inorganic acid is sulfuric acid.

11. The process as set forth in claim 7 in which said dissolving agent is a base.

12. The process as set forth in claim 11 in which said base is sodium hydroxide.

* * * * *